United States Patent

Zawodny

[11] 4,277,158
[45] Jul. 7, 1981

[54] CAMERA

[75] Inventor: Arthur Zawodny, Budd Lake, N.J.

[73] Assignee: Keystone Camera Corporation, Clifton, N.J.

[21] Appl. No.: 101,409

[22] Filed: Dec. 10, 1979

Related U.S. Application Data

[63] Continuation of Ser. No. 856,841, Dec. 2, 1977.

[51] Int. Cl.³ .................. G03B 3/00; G03B 13/10
[52] U.S. Cl. .................................. 354/197; 354/222
[58] Field of Search .............. 354/197, 221, 222, 286; 352/142

[56] References Cited

U.S. PATENT DOCUMENTS

| | | | |
|---|---|---|---|
| 2,653,528 | 9/1953 | Mueller | 354/197 |
| 2,812,698 | 11/1957 | Tiranti | 354/197 |
| 2,900,887 | 8/1959 | Nerwin | 354/221 X |
| 3,083,628 | 4/1963 | Tsugawa | 354/197 X |
| 3,836,934 | 9/1974 | Suzuki et al. | 354/197 |
| 3,890,626 | 6/1975 | Ettischer | 354/197 |
| 3,961,344 | 6/1976 | Baisch et al. | 354/222 |
| 4,038,671 | 7/1977 | Schroder et al. | 354/197 |
| 4,038,673 | 7/1977 | Schroder | 354/197 X |
| 4,104,663 | 8/1978 | Yamazaki et al. | 354/197 |

Primary Examiner—L. T. Hix
Assistant Examiner—Thomas H. Tarcza
Attorney, Agent, or Firm—Neuman, Williams, Anderson & Olson

[57] ABSTRACT

A small pocket type camera is provided which includes a plurality of picture-taking lenses and a corresponding plurality of viewfinder lenses. The lens system is arranged so that upon changing the picture-taking lens from one system to another the appropriate viewfinder lens will automatically be moved to the viewfinder optical axis whereby the magnification of the subject to be photographed, as seen by the user through the viewfinder lens, will correspond to the magnification of the subject as recorded on the film through the picture taking lens.

14 Claims, 10 Drawing Figures

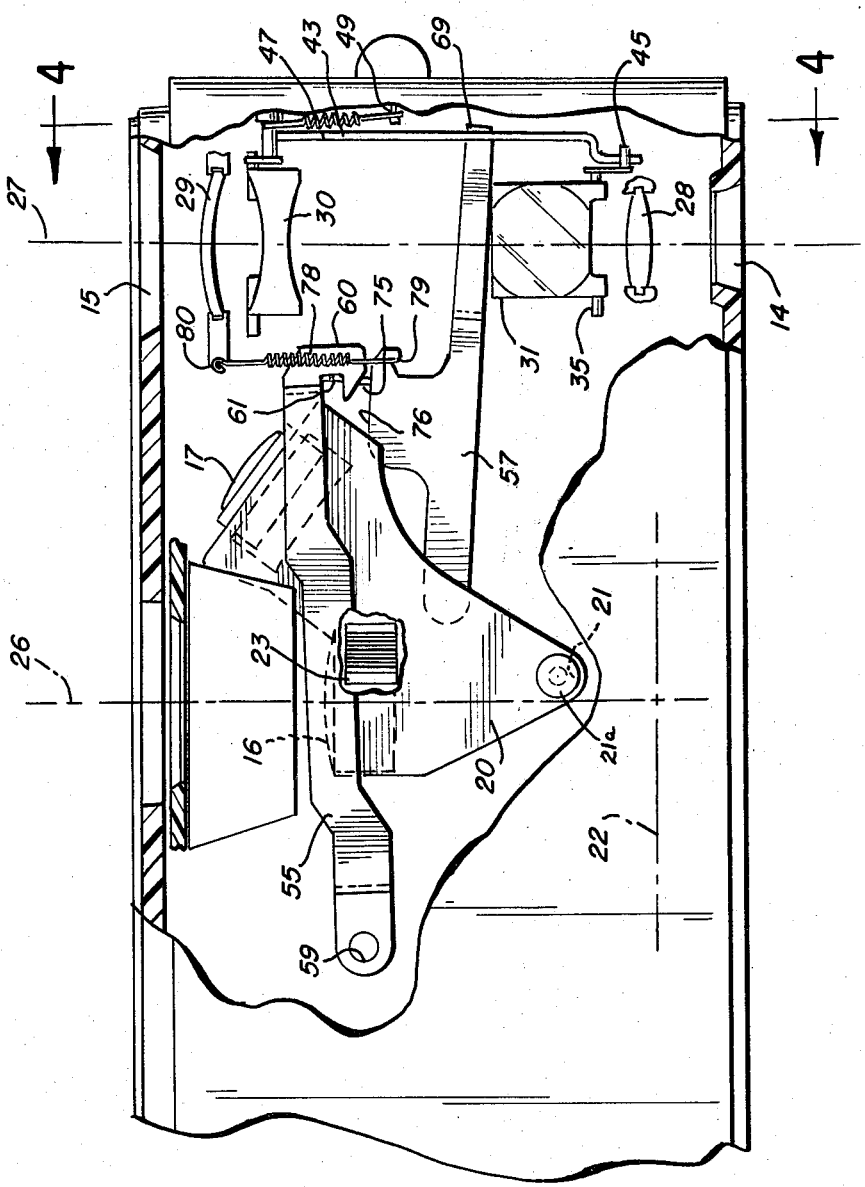
FIG. 3
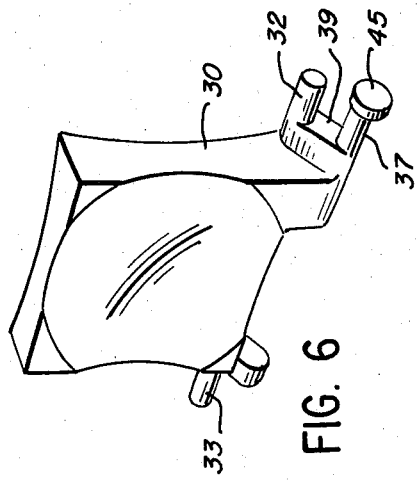
FIG. 6
FIG. 7

CAMERA

This is a continuation of application Ser. No. 856,841 filed Dec. 2, 1977.

BACKGROUND OF THE INVENTION

In the photographic field there has been a trend toward miniaturizing the size of cameras and in recent years relatively small and inexpensive cameras have been designed which can easily fit into a pocket. These "pocket" type cameras have become quite popular and efforts have been made to incorporate features heretofore available only in larger-sized cameras into pocket cameras.

One such important feature which has been incorporated in small pocket cameras is the ability to provide a plurality of picture taking or objective lenses. For example, lenses of different focal lengths such as a telephoto lens and a normal lens can be used, or lenses with special effects such as a portrait lens can also be desired. It is further desirable, however, with such a plurality of objective lenses, to provide a manner of automatically altering the viewfinder lens system so that it will truly correspond to the optical characteristics of the selected objective lens. With a telephoto and normal lens set, for example, the magnification and field of view of the subject as seen through the viewfinder should correspond to the magnification and field of view of the subject as recorded by the camera objective lens being used.

Examples of cameras using a multiple objective lens and corresponding multiple viewfinder lens system are shown in Tiranti, U.S. Pat. Nos. 2,812,698, and Mueller, 2,653,528. Both of these systems, however, are quite complex, bulky and expensive, and are thus unacceptable for the small pocket-type cameras. Other attempts at providing viewfinder lens systems which correspond to the optical characteristics of selected picture taking lenses are disclosed in Suzuki et al, U.S. Pat. Nos. 3,836,934, Baisch et al, 3,961,344 and in German DT-PS No. 815,441. In Suzuki, and the German patent, however, a supplementary lens is interposed into the optical path of the objective lens and viewfinder lens. This system, by adding an additional lens to an existing system, would not provide as high an optical quality as in systems where the lenses are actually changed and/or replaced. As a general rule, the more lenses in line with the optical paths the greater the chances are for distortion and the poorer the quality. Furthermore, by merely adding a lens, the variance or change in magnification which can be achieved is relatively slight. The Baisch patent discloses a mirror system which rotates in and out of position in order to provide a dual field viewfinder arrangement. As such, separate viewfinder lenses directly corresponding and fitting to the objective lenses are here also not provided and the optical variation of the system is relatively small.

For the modern small type pocket cameras it is thus desirable to have the added feature of multiple objective lenses with a viewfinder lens system that truly corresponds to the optical characteristics of such multiple objective lenses. It is further desirable to have a high quality viewfinder system which is enhanced if separate lenses are provided corresponding to each of the optical lenses being used; the quality would be high, and a relatively large change in optical magnification can be achieved. Furthermore, it is necessary in such a camera to have the multiple objective and viewfinder lens systems and their interconnecting linkages relatively compact. Finally, it is a further necessity to keep the expense of any added features, such as the aforementioned dual lens and viewfinder system, to a minimum both from the standpoint of additional components and from the standpoint of assembly time. In this manner, it would obviously be a distinct advantage to incorporate such a system with a relatively small number of components which, besides being reliable and easy to operate, would be inexpensive and simple in construction.

SUMMARY OF THE INVENTION

The present invention provides an improved pocket type camera which is simple to manufacture and at the same time includes quality features which have heretofore been unavailable in other pocket cameras. The invention involves the ability to change the picture taking or objective lens of the camera and at the same time automatically change viewfinder lenses so that the viewfinder system substantially corresponds to the optical characteristics of the selected picture taking lens.

The camera of the present invention is provided with two separate objective lenses, a telephoto and a normal lens, and two separate pivoted viewfinder lenses, for a corresponding telephoto and normal viewfinder lens system. The two objective lenses are mounted on a rotatable lens plate, which, upon manual motion in changing the objective lens being used, will actuate a series of levers and idler arms to alternately position one of the two pivoted viewfinder lenses into the viewfinder optical path. In this manner, magnification of the subject, as seen by the user, will correspond to the magnification of the subject as recorded by the camera film through the particular objective lens being used.

It is an object of the present invention to provide a functionally improved and mechanically simple pocket-type camera.

It is a further object of the present invention to provide an improved camera with two separate objective lenses and two separate corresponding viewfinder lenses.

It is another object of the present invention to provide a viewfinder system which will automatically change the viewfinder lens when the corresponding objective lens is changed.

It is still another object of the present invention to provide an improved camera with a pivotable viewfinder lens system which is mechanically simple and reliable.

It is yet another object of the present invention to provide an approved camera containing a dual objective lens and viewfinder system, with corresponding lenses automatically positioned, which is relatively easy to assemble, manufacture, and is relatively inexpensive.

Further objects and advantages of the present invention will become apparent as the following descriptions, procedure, and features of novelty which characterize the invention will be pointed out with particularity in the claims annexed to and forming a part of this specification.

BRIEF DESCRIPTION OF THE DRAWINGS

FIG. 3 is a top view of the camera of FIG. 1 partially cut away and exposing the internal levers and arms of FIG. 2;

FIG. 6 is a perspective view of the viewfinder normal lens;

FIG. 7 is a perspective view of the telephoto viewfinder lens.

DESCRIPTION OF THE PREFERRED EMBODIMENT

Figure 1:
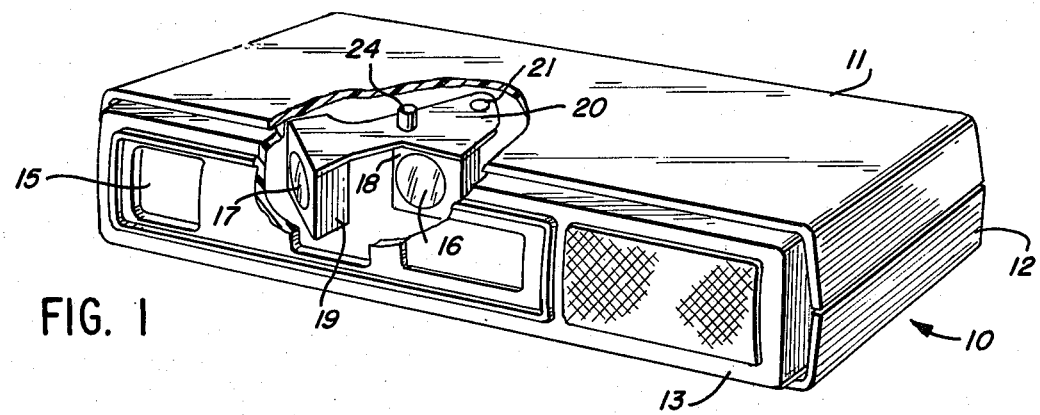
FIG. 1 is a front perspective view of a pocket-type camera incorporating the dual lens and viewfinder system embodying the present invention with a cutaway portion exposing the two separate objective lenses.

Referring now to the drawings wherein like reference characters designate corresponding parts throughout the several views, there is shown a small pocket type camera in FIG. 1 generally designated by reference numeral 10. The camera 10 includes an elongated upper housing member 11, an elongated lower housing member 12 and a front housing member 13. All housing members are preferably made of plastic to provide a camera of relatively light weight whereby it can easily be carried by the user.

The camera of the present invention provides separate lens systems of identical magnification for the separate functions of viewfinding and picture taking. The viewfinding and picture taking systems operate in separate chambers and operate along separate but parallel optical axes. Each optical axis further runs parallel to the sides of the camera and are shown in FIG. 3, center line 26 representing the picture taking optical axis and center line 27 the viewfinder optical axis. As further shown, the picture taking optical axis runs from a film plane 22 through an objective lens systems, to be described in detail below, and out the front of the camera toward the photographic subject. The viewfinder optical axis extends from a viewfinder eyepiece 14, through the viewfinder lens system, also to be described below, and out a viewfinder cover plate 15 to the photographic subject. The two optical axes are placed fairly close together so as to reduce any error due to parallax.

As noted above, there is further provided two different photographic or objective lenses and two corresponding pivoted viewfinder lenses. In the preferred embodiment described herein, the two objective lenses and the viewfinder system have focal lengths equivalent to a normal and a 2X telephoto view, being 23 mm and 46 mm, respectively. It should be understood, however, that any two differing types of lenses may be used, such as normal/wide angle, wide angle/telephoto, or even a normal and special effects lens, such as a portrait lens. The two objective lenses within the camera herein described include a normal lens 16 and a telephoto lens 17.

The normal objective lens 16 is shown in FIG. 1 and FIG. 3 in its operating position in line with the photographic optical axis. The objective lens 17 shown in these figures is in its inoperative or stored position, set off at an angle and out of alignment with the optical axis.

The normal objective lens 16 and telephoto objective lens 17 are secured in substantially square holders, 18 and 19, respectively. These holders are perpendicularly mounted on a rotatable lens plate 20 which is secured and pivoted on a pin 21a (FIG. 3) at pivot point or aperture 21. In order to change objective lenses, the lens plate 20 is rotated altering the position of the attached lenses, moving one lens out of alignment with the optical axis and the other in alignment. For example, when the lens plate 20 is rotated in a counterclockwise direction from the position shown in FIG. 1 or FIG. 3, about its pivot point at aperture 21, the normal lens 16 wil be moved to the right as seen in FIG. 1 and to the left as seen in FIG. 3 out of alignment with the picture taking optical axis while at the same time the telephoto lens 17 will be rotated into its operative position in alignment with the picture taking optical axis. Appropriate stop members designed to abut lens plate 20 in either of its alternate positions are formed within the housing member 11 so as to establish and assure the proper positioning of lens plate 20.

Figures 1A, 2:
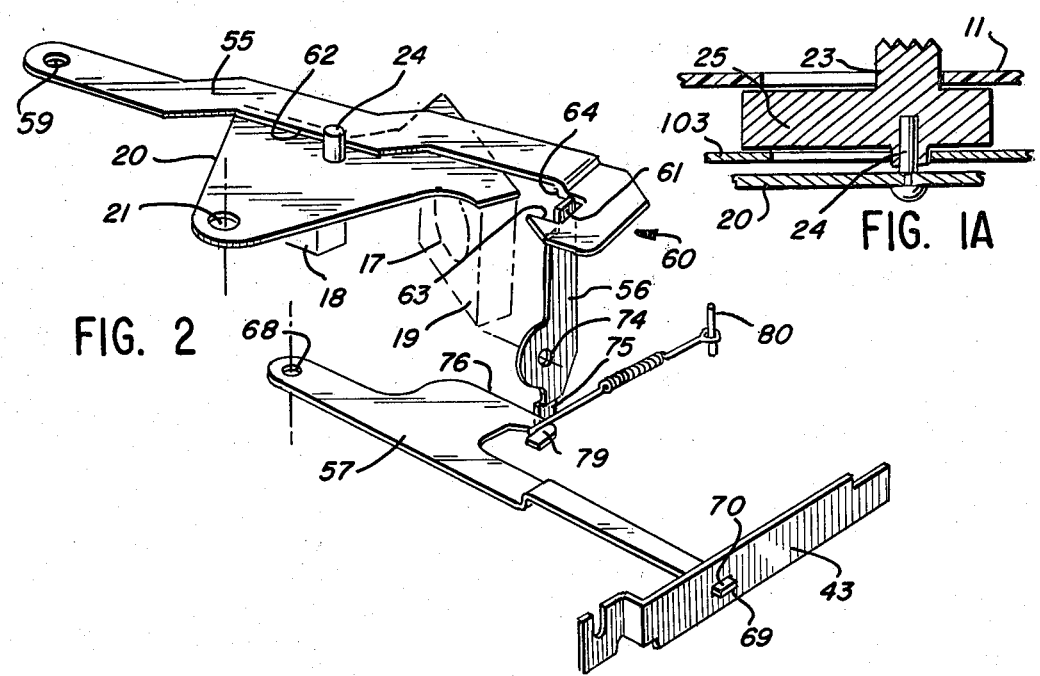
FIG. 1A is a front sectional view showing the indexing slide located on top of the camera at the cutaway portion of FIG. 1.
FIG. 2 is a perspective view of the series of levers and arms connecting the objective lenses to the viewfinder lenses, these components arranged in the normal lens position.

For use in manually rotating the lens plate 20 to its various positions to set the camera in its normal or telephoto mode of operation, there is provided an indexing slide 23 shown in FIG. 1A, movably positioned and secured between the camera housing 11 and a slide retaining plate 103. The indexing slide 23 is provided with an aperture or slot 25 (FIG. 1A) for drivingly receiving a cam pin 24 secured on one side of and perpendicular to the lens plate 20. In this manner, lateral movement of indexing slide 23 along the elongated axis of camera 10 will cause an edge of slot 25 to abut and push cam pin 24 thereby rotating lens plate 20 about its pivotal axes at aperture 21. The slot 25 is formed of sufficient length and provided with sufficient space so as to allow for the non-linear motion of cam pin 24 in rotation about the pivot point at 21. Indexing slide 23 is further suitably spring biased so as to provide a bistable configuration, corresponding to the normal and telephoto camera positions.

Figure 4:
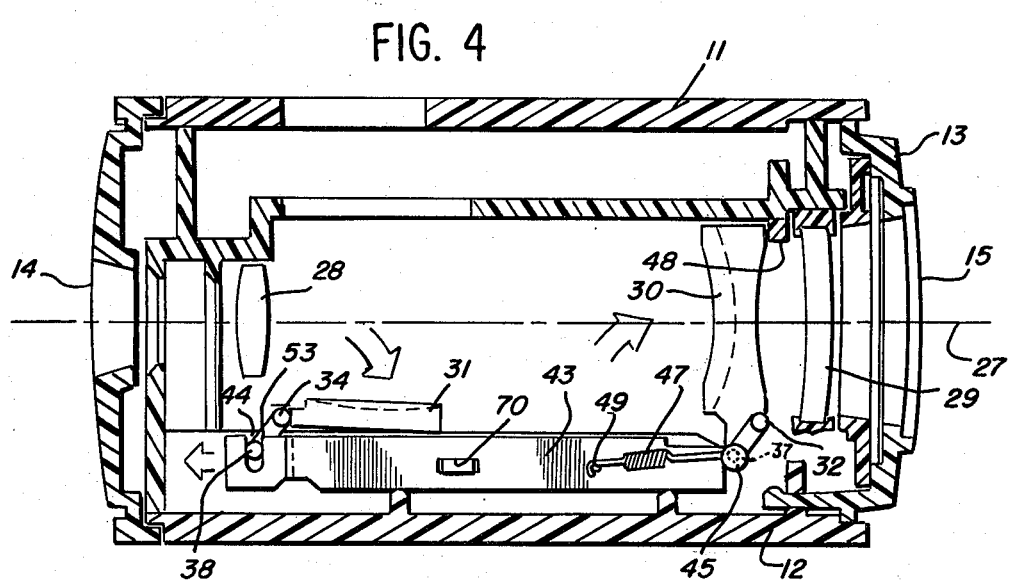
FIG. 4 is a sectional view taken generally on line 4—4 of FIG. 3 and showing the viewfinder lens configuration in the normal lens position.
Figure 4A:
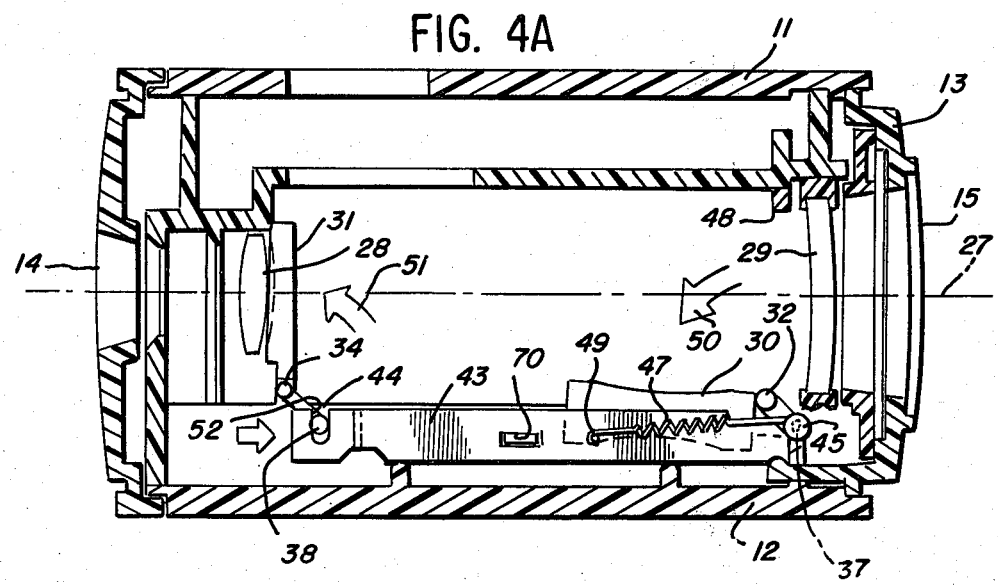
FIG. 4A is a sectional view taken generally on line 4—4 of FIG. 3, as in FIG. 4, and showing the viewfinder lens system in the telephoto lens position.

The camera of the present invention also provides two separate pivoted viewfinder lenses for use with the corresponding two objective lenses, 16 and 17. In particular, the viewfinder system of the present invention includes two stationary lenses and two pivoted lenses, the two stationary lenses and only one of the two pivoted lenses being used at any particular moment. As shown in FIGS. 3, 4 and 4a, a stationary viewfinder eye lens 28 and a stationary front lens 29 are positioned in alignment with the viewfinder optical axis and toward the rear and forward ends of the camera, respectively. Between these two lenses are positioned a pivoted normal viewfinder lens 30 and a pivoted telephoto viewfinder lens 31. When the normal objective lens 16 is in its operative position the normal viewfinder lens 30 is in its vertical position, in alignment with the viewfinder optical axis 27, and the telephoto lens 31 is pivoted to its horizontal or inoperative position out of alignment with the optical path. In this configuration, as shown in FIG. 4, the viewfinder system including eye lens 28, normal viewfinder lens 30 and front lens 29 will provide a field of view corresponding to that of the normal objective lens. Alternatively, when the telephoto lens 17 is in its operative position the telephoto viewfinder lens 31 is in its vertical position, in alignment with the viewfinder optical axis, and the normal lens 30 is pivoted to its horizontal inoperative position, as shown in FIG. 4A. This latter configuration provides a field of view corresponding to that of the telephoto objective lens. The large 2X power magnification is achievable because of the use of two entirely different and interchangeable lenses and their relative positions within the viewfinder system.

As shown in FIG. 6, normal viewfinder lens 30 is provided with pivot arms 32 and 33 extending in opposite directions at one edge of the lens, at which the lens 30 may be secured and rotated. Similarly, telephoto viewfinder lens 31, as shown in FIG. 7, is constructed with pivot arms 34 and 35 extending therefrom at which the telephoto viewfinder lens may be supported and rotated. In order to facilitate rotating the two pivoted viewfinder lenses in and out of their operative positions there is further provided engaging pawls 37 and 38 parallel to and in spaced relation from the pivot arms of the normal viewfinder lens 30 and the telephoto viewfinder lens 31, respectively. Engaging pawl 37 is spaced apart from and positioned below and to one side of pivot arm 32 through a relatively short base member 39. Engaging pawl 38 is identically spaced apart from and positioned below and to one side of pivot arm 34 through base member 40. The specific rotation and mode of operation of the viewfinder lenses, pivot arms, and the engaging pawls will be described in detail below. The construction of these elements, however, is unique in that each lens with its supporting pivot arms and operational engaging pawls is made from one piece of material, preferably acrylic. In this fashion, there is no need for separate supporting and operative hardware which would increase material costs as well as assembly time.

Figure 5:
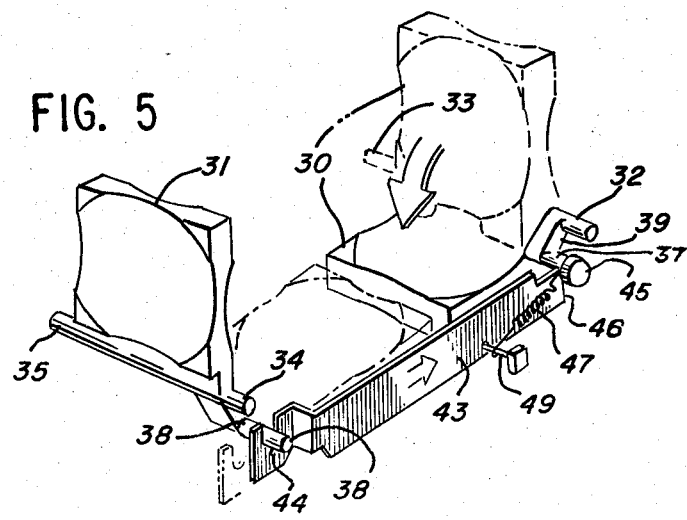
FIG. 5 is a perspective view of the operation of the two lenses used in the viewfinder system.

The specific operation of the two pivoted viewfinder lenses in their several modes of operation is further isolated in FIG. 5. As shown therein and also in FIG. 4, normal viewfinder lens 30 is spring biased to its vertical operative position by a helical spring 47, one end of which is attached to engaging pawl 37 and the other end attached to a convenient stationary housing member 49 toward the middle of the camera. Spring 47 is further prevented from sliding off engaging pawl 37 by a large head portion 45 attached to the free end of pawl 37 as shown in FIG. 6. In this configuration, spring 47 will exert a pulling force to the left and below pivot arms 32 and 33 creating a clockwise torque as viewed in FIG. 5. A stop member 48, shown in FIG. 4, establishes the proper operative position of lens 30 and prevents over rotation thereof under the force exerted by spring 47. While spring 47 is shown in this preferred embodiment as a helical or coiled spring, any type of biasing force could alternatively be used, such as, for example, a torsion spring with its axis at pivot arm 32, one leg extending across engaging pawl 37 and the other leg fixed against an appropriate stationary housing member.

The primary control and operation of the two pivoted viewfinder lenses is provided by an elongated viewfinder lens actuator slide 43 extending between the engaging pawl 37 of viewfinder lens 30 and the engaging pawl 38 of viewfinder lens 31. A slot 44 is located at one end of the actuator slide 43 for receiving the free end of engaging pawl 38. An edge 46 located at the opposite end of slide 43 is positioned to abut engaging pawl 37 within enlarged head portion 45.

In this construction, and as best shown in FIGS. 4A and 5, forward motion of the viewfinder lens actuator slide 43 will cause edge 46 to exert a substantially horizontal and forward force on engaging pawl 37, against the biasing force exerted by spring 47. Due to the spaced relation of engaging pawl 37 from the axis of rotation of lens 30 along pivot arms 32 and 33, lens 30 is then caused to rotate in a counterclockwise direction and into its inoperative or stored position as shown. It is further necessary, however, that the engaging pawl always be located beneath the axis of rotation as shown in FIGS. 4 and 4A. In this manner the force created by lateral movement of slide 43 will not intersect the axis of rotation which would otherwise reduce any resultant torque or movement to zero and cause the lens to jam.

Whereas the normal lens 30 is rotated to its inoperative position by the actuator slide 43 and is directly rotated to its operative position under the force of spring 47 when otherwise unrestrained by slide 43, the telephoto lens 31 is directly rotated to both its operative and inoperative positions under the force exerted by the actuator slide 43 without the use of an additional spring member. Specifically, upon forward motion of the slide 43, a back edge 52 of slot 44 will engage and push forward engaging pawl 38 thereby rotating the viewfinder lens 31 in a counterclockwise direction and into position along the viewfinder optical axis as shown in FIG. 4A. Upon rearward motion of actuator slide 43, a forward edge 53 of slot 44 will similarly engage and force backward engaging pawl 38 thereby imparting a clockwise rotation upon viewfinder lens 31 about the pivotal arms 34 and 35 and rotating this lens to its inoperative or stored position as shown in FIG. 4. As explained above with regard to engaging pawl 37, engaging pawl 38 must similarly always be located beneath the axis of rotation along pivot arms 34 and 35 so as not to jam the motion of lens 31. In view of the above, it can be seen that there is only one member, actuator slide 43, which controls, by forcing or permitting, the rotation of both viewfinder lenses. The use of this single member to control both lenses as described as well as the mechanically simple and direct means of rotation of the lenses, allows for a reliable, compact, and inexpensive viewfinder system than heretofore unavailable.

Figure 2A:
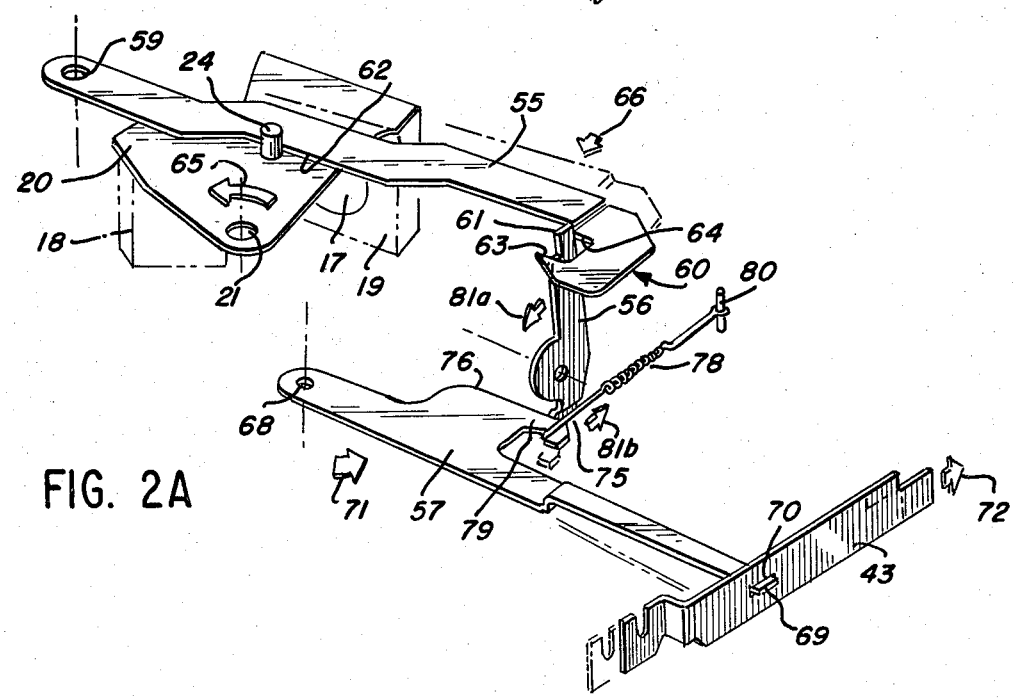
FIG. 2A is the same series of levers and arms shown in FIG. 2 but moved to the alternate or telephoto lens position.

The mechanical linkages between the objective lenses and the viewfinder lenses is clearly shown in FIG. 2, FIG. 2A and FIG. 3. As specifically shown in FIG. 2 and FIG. 2A, there is provided an elongated first actuating lever 55, an intermediate actuator arm 56, and a second elongated actuating lever 57 operatively connected between the objective lenses via camming pin 24 and lens plate 20 and the viewfinder lenses via the viewfinder lens actuator slide 43. The first actuating lever 55 is secured and rotatably mounted at one end thereof on a pin (not shown) inserted through an aperture 59. The opposite end of actuating lever 55 is formed in a hooklike configuration 60 with inside edge 63 drivingly engaging an upper projection 61 of intermediate actuating arm 56. Approximately midway between aperture 59 and hooklike member 60 of the first actuating lever 55 there is provided a lateral edge 62 abutting and in driven engagement with cam pin 24.

FIG. 2 shows the internal series of connecting levers and arms arranged in the camera's normal lens mode of operation. In this position camming pin 24 is in its forwardmost location in rotation about aperture 21. As such, the first actuating lever 55, driven by camming pin 24, is pushed to its forwardmost, or farthest counterclockwise position. Upon rotation of lens plate 20 in a counterclockwise direction as indicated in FIG. 2A by an arrow 65, thereby placing the camera in its telephoto mode of operation, camming pin 24 will be moved rearward and to the left so as to permit clockwise rotation of the first actuating lever 55 as shown by an arrow 66. Lever 55 is thus allowed to be moved from the dotted line figure in FIG. 2A to the solid line figure shown. The biasing force causing this motion of actuating lever 55 will be described in detail below.

The second actuating lever 57, which acts to impart the forward and back motion to the lens actuator slide 43, is supported and rotatably mounted at one end thereof at aperture 68, through which a pin or other such axle may be inserted. The opposite end of lever 57, generally designated as numeral 69, is drivingly engaged through the lens actuator slide 43 by insertion through a slot 70 centrally located within this slide. As such, counterclockwise rotation of the second actuating lever 57 as shown by arrow 71 in FIG. 2A will force the lens actuator slide 43 forward in the direction shown by arrow 72. This forward motion of the slide will cause the viewfinder lenses to be rotated into the alternate or telephoto configuration in the manner previously described. Similarly, the clockwise rotation of the second actuating lever 57 will force the actuator slide 43 rearward thereby switching the viewfinder lens system to its normal mode of operation.

The first actuating lever 55 and second actuating lever 57 are drivingly interconnected by the intermediate actuating arm 56. As shown in FIG. 2 and FIG. 2A, the two actuating levers are substantially parallel, the first actuating lever 55 being located above the second actuating lever 57. The intermediate actuating arm 56 is rotatably positioned perpendicular to the two actuating levers and is centrally secured and pivoted at aperture 74. As previously noted, end 61 of the intermediate actuating arm 56 is inserted within the hook-shaped member 60 of the first actuating lever 55. The opposite end of intermediate actuating arm 56, referenced as numeral 75, abuts and pushes against a forward edge 76 of second actuating lever 57. In this manner and as shown in FIG. 2, counterclockwise rotation of the first actuating lever 55, resulting from movement of the camera to its normal lens position, will cause edge 63 to engage and push end 61 of arm 56 forward thereby imparting a clockwise rotation to arm 56. This clockwise movement, continuing the chain of interconnecting motions, will rotate lower projection 75 of arm 56 rearward into engagement with edge 76 of the second actuating lever 57 thereby imparting clockwise motion to lever 57 about aperture 68.

In a similar fashion as just described but in the reverse direction, when the camera is in motion into its telephoto position as shown in FIG. 2A, intermediate actuating arm 56 will impart a rotation to the first actuating lever 55 in response to a counter rotation of the second actuator lever 57. The second actuator lever 57 is permanently biased in the counterclockwise direction about aperture 68 by a helical spring 78, one end thereof attached to the actuating lever at a hook-shaped member 79 and the other end of this spring secured to a convenient stationary housing member shown as numeral 80. As such, lever 57 will assume the forward position shown in FIG. 2A unless forced rearward upon rotation of the normal objective lens into its operative position as described above. Similarly, whenever the telephoto objective lens is rotated to its operative position from its inoperative position, lever 57 will cease being restrained rearward under the interconnecting linkage through cam pin 24, lever 55 and arm 56 and will be pulled forward under the force exerted by spring 78. Edge 76 will then force projection 75 forward rotating arm 56 counterclockwise as indicated by arrows 81a and 81b and end 61, engaging end 63, will rotate lever 55 clockwise as indicated by arrow 66.

Briefly summarizing the overall operation of the present invention, as the lens plate 20 is rotated by the user through indexing slide 23 and camming pin 24 bringing either the normal objective lens 16 or the telephoto lens 17 within the picture taking optical axis, the first actuating lever 55, intermediate actuating arm 56 and second actuating lever 57 will be forcibly rotated under the influence of camming pin 24 or helical spring 78 and their interconnecting members so as to move the viewfinder lens actuating slide 43 to the front or back of the camera. This motion of the viewfinder actuator slide will cause rotation of both the normal viewfinder lens 30 and the telephoto viewfinder lens 31 whereby one of these viewfinder lenses will be positioned in line with the viewfinder optical axis and the other rotated horizontally out of alignment with the optical axis depending upon the objective lens being used. The engaging means between the single actuator slide controlling both viewfinder lenses and the lenses themselves are constructed as part of and from the same material as the lenses thereby reducing material costs and assembly time. As such, there has been shown and described a relatively mechanically simple, compact and reliable system for changing objective or picture taking lenses with a mechanical linkage to correspondingly change the viewfinder system so that the user is able to view the subject with the same magnification and field of view as being registered on the film. While the invention has been described herein with particular application to a pocket camera, it is to be understood that it can similarly be used with larger camera systems.

While there have been shown and described several embodiments of the present invention, it will be apparent to those skilled in the art that numerous changes and modifications may occur, and it is intended in the appended claims to cover all such changes and modifications which fall within the spirit and scope of the present invention.

What is claimed as new and desired to be secured by Letters Patent of the United States is:

1. A photographic camera having an objective optical axis and a viewfinder optical axis comprising: a first and a second objective lens; corresponding first and second viewfinder lenses; each objective lens and each viewfinder lens being selectively movable to or from a stored position out of alignment with an optical axis and an operating position in alignment with an optical axis whereby only one of said objective lenses and one of said viewfinder lenses is operative at any particular moment; each of said viewfinder lenses being rotatable about an axis substantially along one edge thereof betwen said stored position and said operative position; connecting means for moving said first viewfinder lens to its operating position and said second viewfinder lens to its stored position upon movement of said first objective lens to its operating position and alternatively to move said second viewfinder lens to its operating position and said first viewfinder lens to its stored position upon movement of said second objective lens to its operating position; said connecting means comprising an elongated actuator slide in operable engagement with each of said viewfinder lenses and being positioned and movable parallel to said viewfinder optical axis.

2. A photographic camera as claimed in claim 1 wherein each of said viewfinder lenses comprises two elongated pivot arms extending in opposite directions along said axis whereby said lenses are supported by and rotated about said pivot arms between their respective storage position and operating position.

3. A photographic camera as claimed in claim 2 comprising an engaging pawl parallel to and in spaced relationship from one of said pivot arms on each viewfinder lens; and said elongated actuator slide being in operable engagement with said engaging pawls on each of said viewfinder lenses.

4. A photographic camera as claimed in claim 3 where each of said viewfinder lenses and its assocaited pivot arms and engaging pawl is formed from one piece of material.

5. A photographic camera as claimed in claim 3 wherein said elongated actuator slide extends at least from the engaging pawl of said first viewfinder lens to the engaging pawl of said second viewfinder lens causing rotation of said viewfinder lenses between said stored position and said operating position upon lateral movement of said actuator slide.

6. A photographic camera as claimed in claim 5 wherein said lens actuator slide contains a slot at one end thereof for receipt of said engaging pawl on said first viewfinder lens whereby said first viewfinder lens is rotated to its operating or stored position upon the force exerted through said slot pushing or pulling said engaging pawl of said first viewfinder lens in a direction parallel to said viewfinder optical axis.

7. A photographic camera as claimed in claim 5 wherein said second viewfinder lens is spring biased to one of its said positions, whereby said second viewfinder lens will be rotated to its alternate position upon pressure exerted by said lens actuator slide against the engaging pawl of said second viewfinder lens in a direction parallel to said viewfinder optical axis.

8. A photographic camera as claimed in claim 2 wherein said elongated actuator slide extends at least from said first viewfinder lens to said second viewfinder lens whereby motion of said actuator slide causes rotation of said viewfinder lenses between said stored position and said operating position.

9. A photographic camera as claimed in claim 8 wherein said connecting means further comprises a series of interengaging linkage members; said first and second objective lenses secured to a mounting means; a first of said interengaging linkage members drivenly engaged with said mounting means; and another of said interengaging linkage members drivingly engaged with said actuator slide whereby motion of said objective lenses will cause motion of said actuator slide through said interengaging linkage members.

10. A photographic camera as claimed in claim 9 wherein said mounting means comprises a rotatably mounted plate member to which said first and second objective lenses are secured whereby rotation of said plate member alternatively causes said first objective lens to be moved to said operating position in unison with said second operating lens being moved to said stored position and said first objective lens to be moved to said stored position in unison with said second operating lens being moved to said operating position; and said first interengaging linkage member comprises a camming member secured to and extending out from said plate member.

11. In a photographic camera, the combination of a first objective lens and a second objective lens; a first rotatable viewfinder lens and a second rotatable viewfinder lens for use in a viewfinder system; each of said objective lenses and each of said viewfinder lenses movable between an operative position in alignment with an optical axis and an inoperative position out of alignment with said optical aixs; each of said rotatable viewfinder lenses being rotatable about an axis substantially along one edge thereof between said operative position and said inoperative position, said operative and inoperative viewfinder positions being substantially perpendicular to each other for each viewfinder lens; two pivot arms extending in opposite directions along said rotatable axis of each viewfinder lens whereby said lenses are supported by and rotated about said pivot arms between their respective operative position and inoperative position; an engaging pawl parallel to and in spaced relationship from one of said pivot arms on each viewfinder lens receiving force exerted parallel to the optical axis of said viewfinder lenses tending to rotate said viewfinder lenses about their respective pivot arms; means for mounting said objective lenses whereby when one of said objective lenses is in its operative position the other of said objective lenses is in its inoperative position; an elongated actuator slide extending between and interengaging said engaging pawls on each viewfinder lens and movable parallel to said optical axis providing said force such that when one of said viewfinder lenses is in its operative position the other of said viewfinder lenses is in its inoperative position; and means for interconncting said objective lenses and said actuator slide whereby when said first objective lens is in its operative position said actuator slide forces said first viewfinder lens to its operative position and when said second objective lens is in its operative position said actuator slide forces said second viewfinder lens to its operative position.

12. A photographic camera as claimed in claim 11 wherein said interconnecting means comprises at least two interconnecting linkage members; a first member of said interconnecting linkage members drivenly engaged with said mounting means; and another member of said interconnecting linkage members drivingly engaged with said actuator slide.

13. A photographic camera as claimed in claim 12 wherein said mounting means includes a rotatably mounted plate member on which said first and second objective lenses are secured; said first member of said interconnecting linkage members comprising a cam member secured to and extending out from said plate member; and said cam member drivingly engaged with another of said interconnecting likage members.

14. A photographic camera as claimed in claim 12 wherein said actuator slide contains a slot therein; said first member containing an elongated arm extending therefrom; and said elongated arm drivingly received within said slot whereby rotation of said first member will cause said lateral movement of said actuator slide.

* * * * *